Feb. 10, 1925.

H. CROSS 1,525,983

HOPPER FOR WEIGHING MACHINES

Filed Oct. 7, 1922

INVENTOR
Herbert Cross,
by his attorney,
J. Edward Thebaud.

Feb. 10, 1925.
H. CROSS
1,525,983
HOPPER FOR WEIGHING MACHINES
Filed Oct. 7, 1922     2 Sheets-Sheet 2
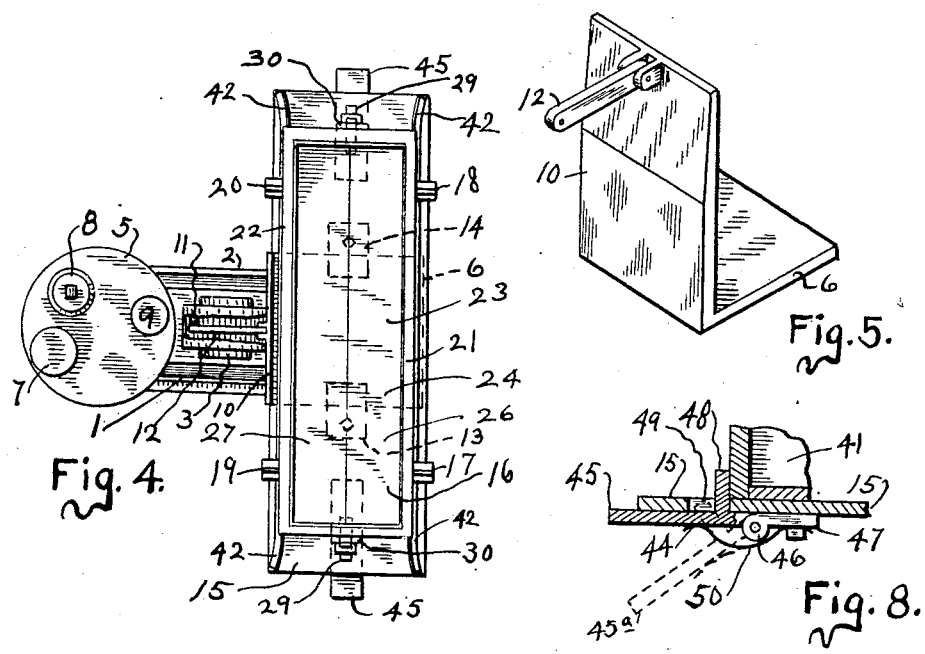
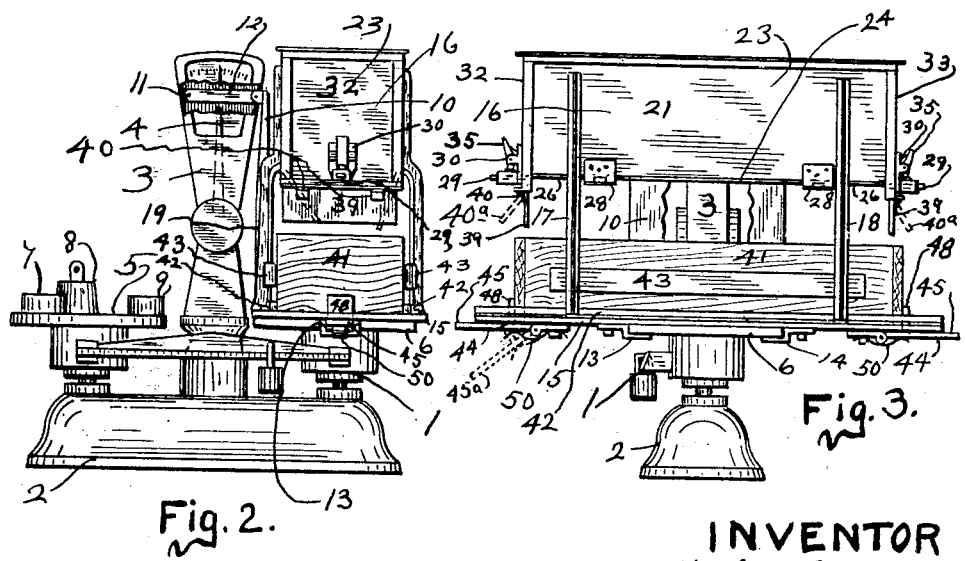
INVENTOR
Herbert Cross,
by his attorney,
J. Edw. Thebaud.

Patented Feb. 10, 1925.

1,525,983

UNITED STATES PATENT OFFICE.

HERBERT CROSS, OF CYNWYD, PENNSYLVANIA.

HOPPER FOR WEIGHING MACHINES.

Application filed October 7, 1922. Serial No. 593,079.

*To all whom it may concern:*

Be it known that I, HERBERT CROSS, a citizen of the United States, residing at Cynwyd, in the county of Montgomery and State of Pennsylvania, have invented new and useful Improvements in Hoppers for Weighing Machines; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to hoppers for weighing machines.

When weighing such material as macaroni, spaghetti and other material packed in boxes or cartons as containers, it is customary to first weigh the container, then note down its weight empty, then weigh the same when full and deduct the weight of the container to ascertain the weight of the contents.

It is one of the objects of my invention to provide means to be used in conjunction with a weighing scales, which will eliminate the necessity of weighing the container and afford a ready method of weighing only the contents of the container, the cubical contents so weighed being equal to the packed cubical contents of the container.

Another object is to provide a weighing hopper having a removable bottom and of a given capacity, in which to weigh material, in a position directly above a space on the weighing platform of a weighing machine, permitting a container to occupy said space, whereby the weighed material can drop into said container when the bottom of the hopper is released to dump its contents.

A further object is to provide in a hopper device, releasable stops for releasably fixing the position of a container under the weighing hopper to fully register with the hopper and the load as the latter is dropped bodily from the said hopper.

A further object is to provide in a hopper device, a weighing hopper having a releasable bottom adapted to permit, upon its release, of a sheer drop of the weighed material into a container, having said hopper of a horizontal section similar in size and form to that of said container, and having said container in registration with said hopper.

With these and other objects my invention resides in certain construction, one embodiment of which is shown in the drawings and is hereinafter described, its use is explained, and what I claim is set forth.

In the drawings,

Figure 2 is a side elevation of a weighing machine having mounted thereon, the hopper device shown in Figure 1, which is here shown in end elevation.

Figure 3 is an end elevation of the weighing machine and hopper device shown in Figure 2, but in this figure, the hopper device is shown in side elevation.

Figure 4 is a top plan of the weighing machine and hopper device shown in Figures 2 and 3.

Figure 5 is a perspective view of an attachment to the weighing machine, designed to give stability to the load carrying plate of the weighing machine.

Figure 8 is a sectional side elevation of one of the releasable stop guides.

Figures 6, 7:
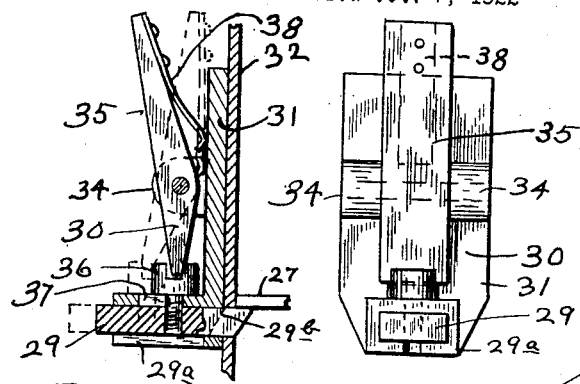
Figure 6 is a sectional side elevation of one of the latches, which releasably support the trap doors forming the bottom of the hopper.
Figure 7 is a front elevation of the latch shown in Figure 6.
Figure 1:
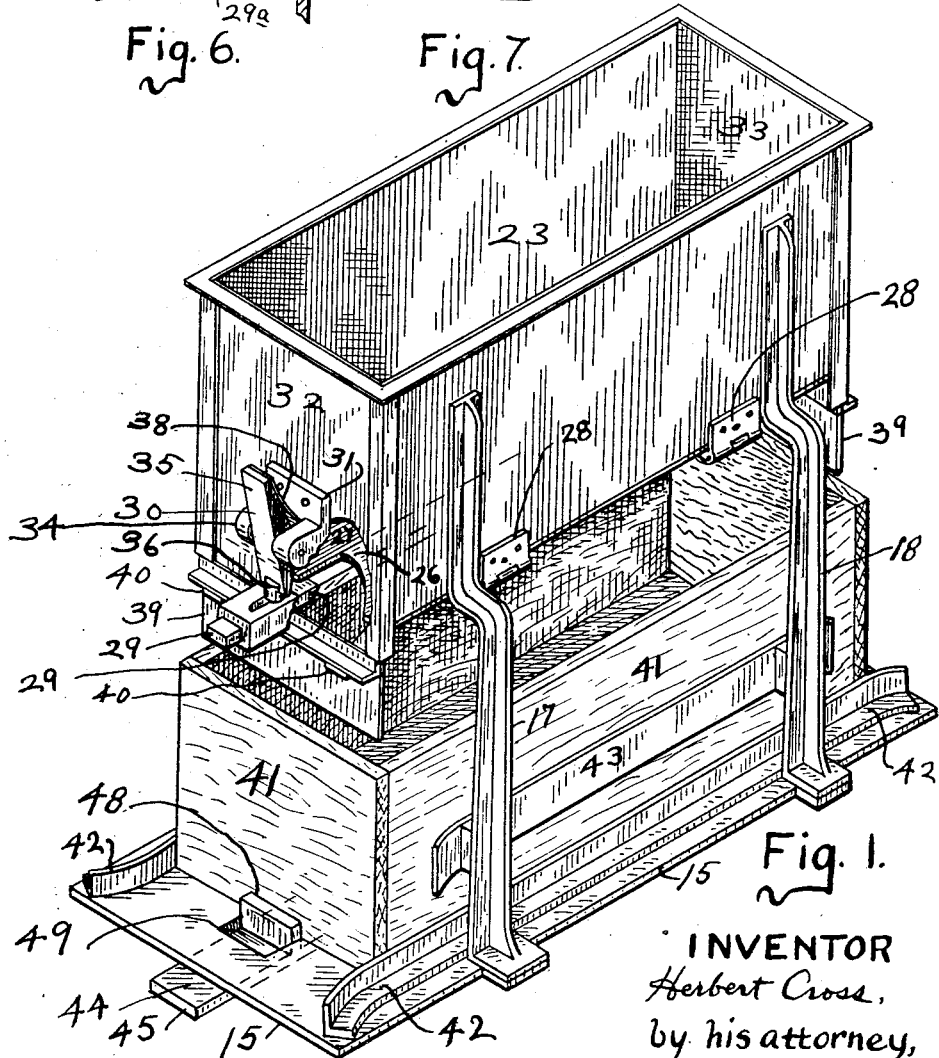
Figure 1 is a perspective view of a hopper device embodying my invention, to be used in connection with a weighing machine.

In the figures, 1 is a weighing machine having a base 2, a tower 3, a pointer 4, and balancing plates or weighing platforms 5 and 6. The plate 5 supports various weights marked 7, 8 and 9, while the plate 6 has a back 10, integral therewith, having its upper end connected by a link 12 to a stud 11, on the inside of the upper part of the tower 3. Fixed to the plate 6, by means of clips 13 and 14, is the bottom plate 15, of the hopper device 16. Fixed to the plate 15 and upstanding thereon, are four posts marked 17, 18, 19 and 20, which are fixed to the sides 21 and 22 of the weighing hopper 23, this weighing hopper 23 is open at the top and has a bottom 24, composed of two hinged doors 26 and 27, connected by hinges 28, with the respective sides 21 and 22. The doors 26 and 27 rest at their junction, at their ends, upon tongues 29 of the latches 30. These tongues 29 reciprocate in channel portions 29$^a$ integral with the latch back 31, fixed one upon each of the end walls 32 and 33 of the weighing hopper 23. Pivoted upon ears 34, of the latch back 31, is a lever 35, engaging a stud 36 which passes through a slot 37, in the channel portion 29$^a$, into fixed relation with the latch tongue 29. A leaf spring 38 normally presses the upper part of the lever 35, outward, and the tongue 29 inward. The end walls 32 and 33 of the hopper 23 have depending therefrom, aprons 39, hinged at 40 and adapted to be swung outwardly, as at positions 40$^a$. Below the weighing hopper 23 is shown a wooden box or container 41, resting upon the bottom plate 15, between guides 42, fixed upon the plate 15, and guides 43 fixed upon the posts 17, 18, 19 and 20, above the guides 42. The length and breadth of the inside of the weighing hopper 23 is about the same as, but a little smaller than, the inside length and breadth of the box or container 41. The box 41 is positioned endwise by the releasable stops 44, which consist of a part 45, extending beyond the bottom plate 15, and hinged at 46, to the part 47, fixed to the plate 15. The part 45 has an upstanding lug 48, passing through the hole 49 in the plate 15. A leaf spring 50 keeps the stop part 45 normally up against the plate 15.

In use, the weighing hopper 23 is provided of a size a little smaller in horizontal dimensions than the box or container 41, but of greater depth and cubical capacity than the box or container 41, for the purpose of holding the material to be weighed in its loose condition, which packs closer in the box 41 when dropped therein. With the hopper 23 empty, the scales are balanced. Next, the weights 7, and 8 are placed upon the plate 5, in sufficient amount, to equal the weight of the amount of material to be weighed in the weighing hopper 23. Loose material is next put into the weighing hopper 23 until the scales come to a balance, as indicated by the pointer 4, after which, with the box or container 41 in the position shown in the figures, the tongues 29, of the latches 30, are withdrawn by simultaneously pressing in the levers 35, with both hands, bringing the tongues 29 to the position 29$^b$, as shown in Figure 6, thus releasing the bottom or trap doors 26 and 27 to drop and hang straight down with their inner faces flush with the inner sides of the weighing hopper 23, and empty the hopper contents, all in one bulk, to drop into the box 41. Upon depressing the stop part 45, to withdraw the lug 48 below the upper surface of the plate 15, the box 41 is drawn across the lug 48 and off the plate 15, to be replaced by another empty box, to be filled. The doors 26 and 27 are raised past the tongues 29 to rest thereon ready for another weighing.

By means of this hopper device, the weight of the box 41 does not enter into the calculation of the weight of its contents and much time is therefore saved.

Inasmuch as changes in the details of construction here shown and described can be made without departing from the spirit and scope of my invention I do not wish to be confined to the one embodiment illustrated and described, hence I claim.

1. A hopper device adapted for use with a weighing machine, having a weighing platform, said device comprising a weighing hopper in which material is weighed, means for supporting said hopper above, in spaced fixed relation to the weighing platform, and a releasable bottom to said box, whereby, upon the release of said bottom, the weighed contents of said hopper are dumped into a container so positioned upon said platform, below said hopper, as to receive said contents, when dumped.

2. In a hopper device for use on a weighing machine, comprising a base, standards projecting upward from said base, a weighing hopper fixed to said standards in spaced relation to and above said base, a bottom hinged to the sides of said hopper, and means for releasably holding said bottom, whereby the weighed contents of said hopper can be dumped into a container positioned between said hopper and said base, when said bottom is dropped.

3. A hopper device for use on a weighing machine, comprising a base plate, a weighing hopper, standards or posts supporting said hopper above said plate in spaced relation thereto, a pair of doors hinged to opposite sides of said hopper at its lower part to form a releasable bottom to said hopper, a latch fixed to said hopper having a slidable tongue to engage said doors, and an apron hinged to depend from a wall adjoining said sides and means for positioning a container upon said plate below said hopper to receive material dropped from said hopper upon the release of said doors.

4. A hopper device adapted for use with a weighing machine, said device comprising a weighing hopper, means for supporting said box above and in spaced relation to the weighing platform of said machine, a releasable bottom to said hopper, guides on said means for positioning a container to receive material weighed in said hopper and released to drop into said container, and releasable stops for positioning said container in longitudinal registration with said hopper.

5. A weighing device comprising a weighing machine having an indicating tower and a weighing platform, an upright member integral with said platform, a link pivoted to said tower and said upright member, near its top, to steady said platform, and a hopper device upon said platform, said device including a hopper, a hinged bottom to said hopper, means releasably holding said bottom in closed position, and other means supporting said hopper in fixed spaced relation to and above said platform, whereby upon the release of said bottom, the weighed contents of said hopper is dumped into a container placed on said platform, below said hopper.

6. A hopper device for use on the weighing platform of a weighing scales, to be used in conjunction with a container, a hopper having vertical sides and a horizontal section similar in size and form to that of said container, means adapted to rest upon said platform supporting said hopper in spaced relation to and above said platform, permitting the placing of said container upon said platform, below said hopper, in registration therewith, a releasable bottom to said hopper, and means for releasably holding said bottom closed, whereby upon the release of said bottom, the contents of said hopper can be dumped bodily into said container.

7. A hopper device adapted for use in conjunction with a container, upon the weighing platform of a weighing scales, comprising a weighing hopper, means adapted to rest upon said platform, supporting said hopper in spaced relation to and above said platform, the sides of said hopper, near its bottom, being parallel with the respective sides of said container, when the container is in vertical registration with said hopper, the horizontal section of said hopper near its bottom, being similar in size and form to that of said container, a releasable bottom to said hopper, adapted to suddenly clear from the path of a sheer drop of material weighed in said hopper, and dropped from the same into said container, and means for releasably holding said bottom closed.

8. A hopper device adapted for use in conjunction with a container upon the weighing platform of a weighing scales, comprising a weighing hopper, means adapted to rest upon said platform, supporting said hopper in spaced relation to and above said platform, the sides of said hopper, near its bottom, being parallel with the respective sides of said container, when said container is in vertical registration with said hopper, the horizontal section of said hopper, near its bottom, being similar in size and form to that of said container, a releasable bottom to said hopper, adapted to suddenly clear from the path of a sheer drop of material weighed in said hopper, and dropped from the same into said container, said bottom comprising a plurality of doors hinged to the sides of said hopper, said doors being adapted to drop to a vertical position forming aprons in continuity to the inner surfaces of the walls to which they are respectively hinged, to prevent material from dropping outside of said container, and means for releasably holding said bottom closed.

HERBERT CROSS.